US006317304B1

(12) United States Patent
De Campos

(10) Patent No.: US 6,317,304 B1
(45) Date of Patent: Nov. 13, 2001

(54) ASSEMBLY OF ELECTRIC MOTOR-CONTROLLING COMPONENTS

(75) Inventor: José Paulo Seidenthal De Campos, Sao Paulo (BR)

(73) Assignee: Texas Instrumentos Electronicos do Brasil LTDA., Sao Paulo (BR)

( * ) Notice: Subject to any disclaimer, the term of this patent is extended or adjusted under 35 U.S.C. 154(b) by 0 days.

(21) Appl. No.: 09/297,018

(22) PCT Filed: Oct. 30, 1997

(86) PCT No.: PCT/BR97/00061

§ 371 Date: Jun. 18, 1999

§ 102(e) Date: Jun. 18, 1999

(87) PCT Pub. No.: WO97/21735

PCT Pub. Date: May 22, 1998

(30) Foreign Application Priority Data

Nov. 13, 1999 (BR) .................................................. 9605552

(51) Int. Cl.[7] .................................................. H02H 7/00

(52) U.S. Cl. ................................ 361/22; 361/23; 361/27

(58) Field of Search ................................ 361/22, 24, 25, 361/27, 23

(56) References Cited

U.S. PATENT DOCUMENTS

| | | | | |
|---|---|---|---|---|
| 4,241,370 | * | 12/1980 | De Filippis et al. | 361/24 |
| 4,319,299 | * | 3/1982 | Woods et al. | 361/24 |
| 4,646,195 | * | 2/1987 | Lisauskas | 361/25 |
| 4,862,306 | * | 8/1989 | Lisauskas | 361/24 |
| 5,170,307 | * | 12/1992 | Nacewicz et al. | 361/24 |

FOREIGN PATENT DOCUMENTS

| | | | |
|---|---|---|---|
| 33 37 738 A1 | | 4/1984 | (DE) . |
| 0516442 A | * | 2/1992 | (EP) . |
| 0 516 442 A2 | | 12/1992 | (EP) . |
| 2 329 096 | | 10/1976 | (FR) . |
| 2 104 732 A | | 3/1983 | (GB) . |

* cited by examiner

*Primary Examiner*—Michael J. Sherry
(74) *Attorney, Agent, or Firm*—Smith, Gambrell & Russell, LLP

(57) ABSTRACT

An assembly of starting elements and protectors for use with electric motors. One of the objectives is to provide an assembly which can be quickly and easily adapted to the housing of a compressor. This objective is achieved by the assembly comprising a capsule having a base (1) and a cover (2) that can be fitted onto the base, a PTC element (80) disposed in the capsule and a motor protector (9) that can be fitted into the capsule in the fitted position of the cover onto the base, the capsule can be received on pins of a terminal connector of a convention compressor.

8 Claims, 5 Drawing Sheets

ASSEMBLY OF ELECTRIC MOTOR-CONTROLLING COMPONENTS

The present invention refers to an assembly of components for controlling an electric motor, and more specifically to an assembly of starting elements and protectors for use with electric motors.

Electric motors typically used in conjunction with cooling compressors are energized by means of three conductive pins, mounted on the housing of the compressor. Usually a motor-starting device, a motor protector and, depending upon the functioning conditions of the equipment, a capacitor are mounted on the outside of the housing, all these elements being covered by a cover.

In general, these components should be bought and mounted individually on the compressor housing, which presents a certain complexity.

Prior art document U.S. Pat. No. 5,170,307, the assignee of which is Texas Instruments Incorporated, discloses a split phase electric motor starter and protector having a housing which receives a PTC starter switch and motor protector. The housing of this device has such a volume that it is not possible to mount it in some of the known compressors. Moreover, due to the construction of the U.S. Pat. No. 5,170,307 device, the motor protector has to be shipped to the customer separately from the housing, the customer having to mount the motor protector on the compressor, and then the housing.

Thus, an objective of the present invention is to provide an assembly of motor-starting device and a motor protector, which can be acquired as a whole and can be quickly and easily mounted on the compressor housing. Another objective of the present invention consists in providing a motor-starting device and motor protector of small volume, which can be adapted to different types of compressors. A further objective of the present invention is to provide a capsule having quick connection terminals, with low insertion forces.

These objectives are achieved by the assembly comprising a capsule made of an electrically insulating material having a base and a cover that can be fitted onto the base, first and second pin-receiving openings formed at the base, a female pin connector disposed on the base in alignment with each pin-receiving opening, a PTC (positive temperature coefficient) element disposed in the capsule, means for electrically connecting the PTC element to the female pin connectors, a motor protector provided with a female pin connector that can be fitted into the capsule in the fitted condition of the cover on the base, the female pin connector and the first and second openings are capable of being received on corresponding pins of a terminal connector of a conventional compressor.

Preferably, the cover is firmly fitted onto the base by means of pins provided at the cover and corresponding slots provided in the base, the pins having a tooth-shaped end portion which engages beyond the thickness of the base wall through which the slot extends. Similarly, the motor protector is fitted firmly into the capsule by means of a pin provided at the cover, the pin having a tooth-shaped end portion which engages a rib provided on the motor protector. These two fittings can be undone by the action of a tool having a pointed or laminar narrow end in the engaging region of said teeth.

Still preferably, two opposed side walls of the cover are provided with loops adapted for receiving a fixing clamp that fixes the assembly to the housing of a compressor.

The invention will now be described in greater detail with reference to a non-limitative embodiment, illustrated in the drawings, in which.

Figure 21:
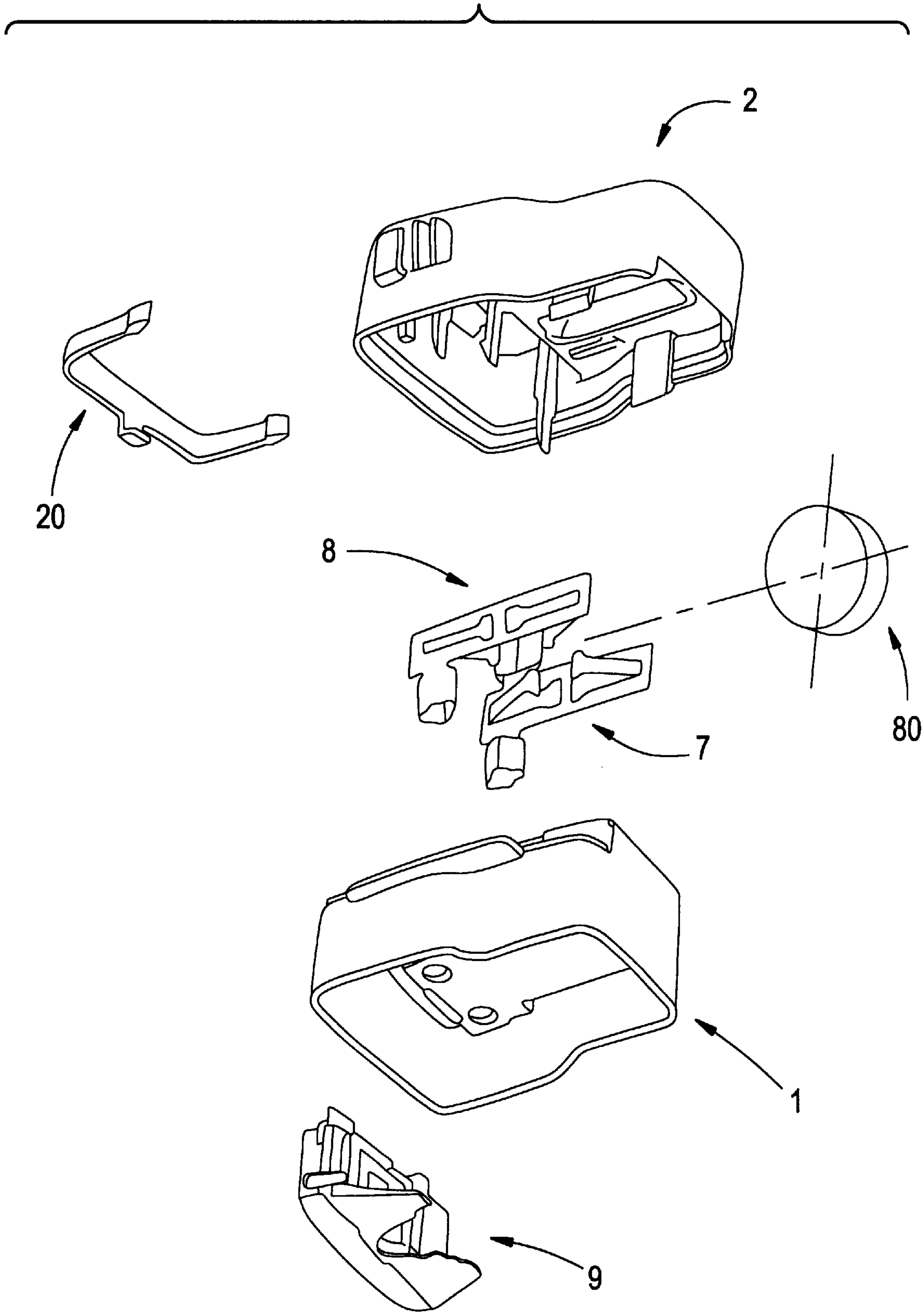
FIG. 21 is an exploded perspective view of the assembly constructed in accordance with the present invention.

With reference to the drawings, particularly FIG. 21, the assembly of electric motor-controlling elements of the present invention comprises a capsule formed by a base 1, a cover 2 that can be fitted onto base 1, a motor-starting PTC (=positive temperature coefficient) resistivity switch, and a motor protector or thermal protector 9, the PTC switch and the thermal protector 9 being mounted inside the capsule.

Figure 7:
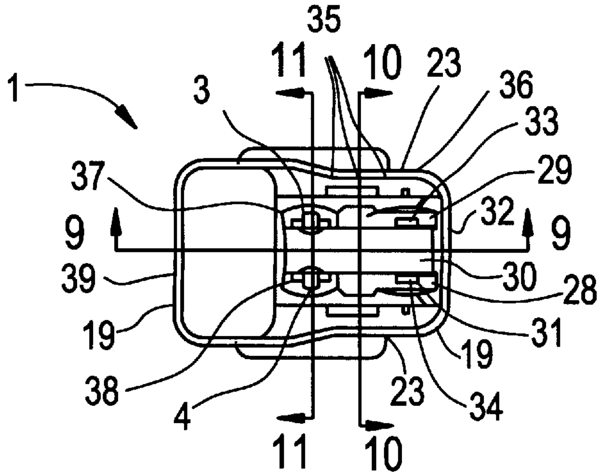
FIG. 7 is a top view of the base.
Figure 8:
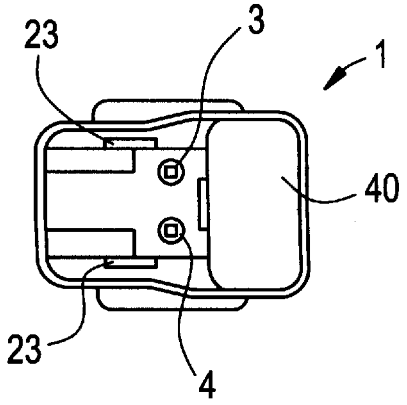
FIG. 8 is a bottom view of the base.
Figure 9:
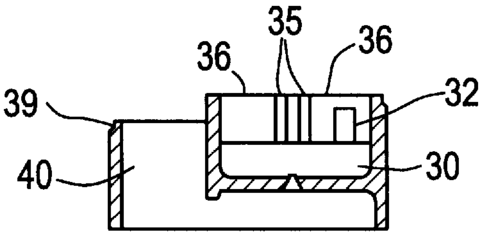
FIG. 9 is a section view along the line AA of FIG. 7.
Figure 10:
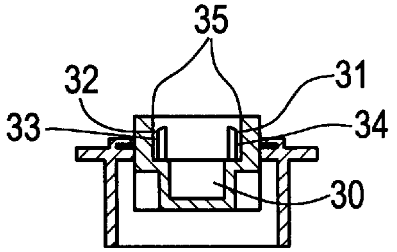
FIG. 10 is a section view along the line BE of FIG. 7.
Figure 11:
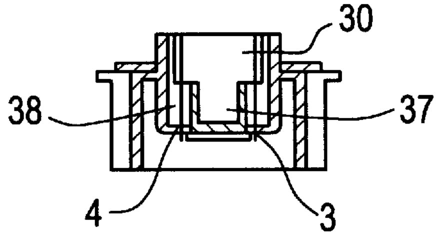
FIG. 11 is a section view along the line CC of FIG. 7.
Figure 13:
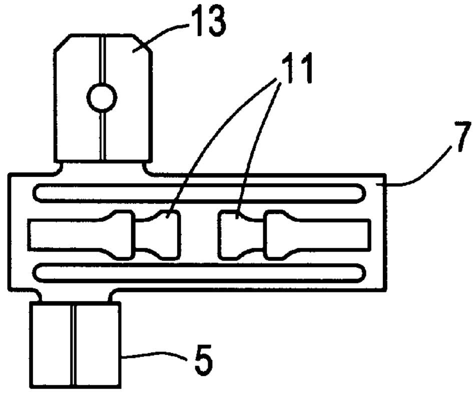
FIG. 13 is a front view of a first electrically conductive element.
Figure 14:
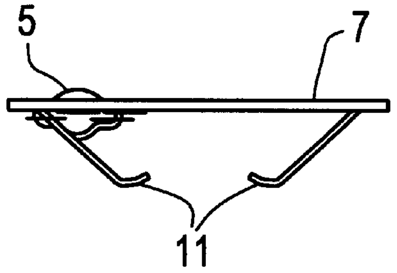
FIG. 14 is a top view of the element illustrated in FIG. 13.
Figure 15:
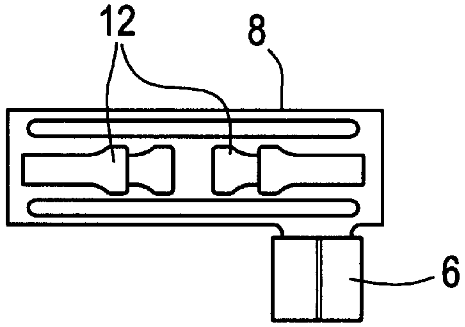
FIG. 15 is a front view of a second electrically conductive element.
Figure 16:
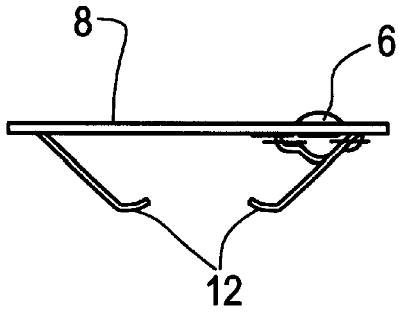
FIG. 16 is a top view of the element illustrated in FIG. 15.
Figure 20:
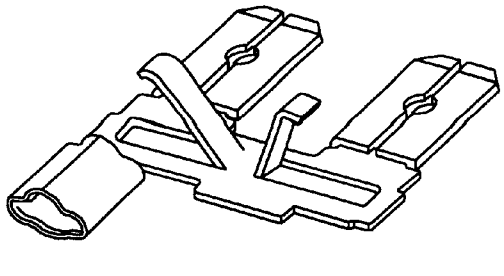
FIG. 20 is a perspective view of an alternative construction for an electrically conductive element.

The PTC switch comprises two electrically conductive elements 7,8, which are mounted in regions 28,29 of the base 1, respectively (FIG. 7). Electrically conductive resilient contact members 11,12 (FIGS. 13 and 15) are provided on the electrically conductive elements 7,8 and butt against a conventional PTC element 80 (FIG. 21), such as a generally cylindrical or disc-shaped element of doped barium titanate having conductive coatings provided on its opposed faces. Although not shown in detail in the drawings, the PTC element 80 is positioned in the region 30 of the base 1, in pressure contact with and between the resilient members 11,12 of the electrically conductive elements 7,8 (FIGS. 7, 9, 10 and 11). FIG. 20 shows an alternative embodiment for an electrically conductive element 7,8.

In order to assist in positioning the electrically conductive elements 7, 8 in the regions 28, 29 of the base (FIG. 10), respective projections 31, 32 are provided at the base 1, so that the elements 7, 8 are located in portions 33, 34, between projections 31, 32, and the remainder of the base housing, away from the region 30 which accommodates the PTC element 80. In this way, a free space is provided around the PTC element 80, which facilitates the thermal cooling of the PTC element 80, when in use. Similarly, the regions of the base which butt against elements 7, 8 are undulated 35, so that there are spaces 36 (FIGS. 7 and 9) between the elements 7, 8 and the base housing 1, which contribute to the thermal cooling of the electrically conductive elements 7, 8.

Figure 2:
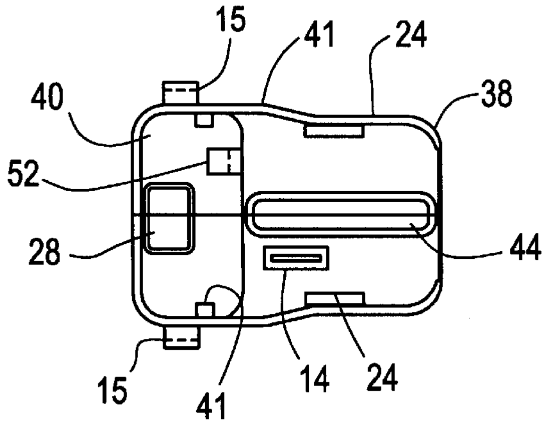
FIG. 2 is a bottom view of the cover.
Figure 4:
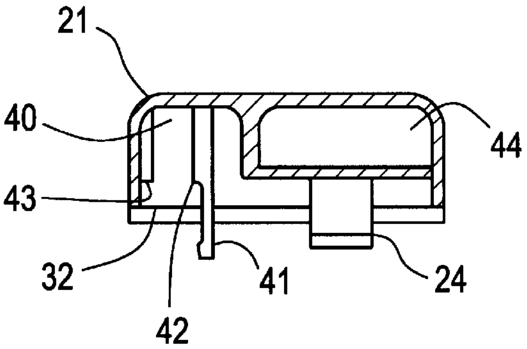
FIG. 4 is a section view along line BB of FIG. 1.
Figure 5:
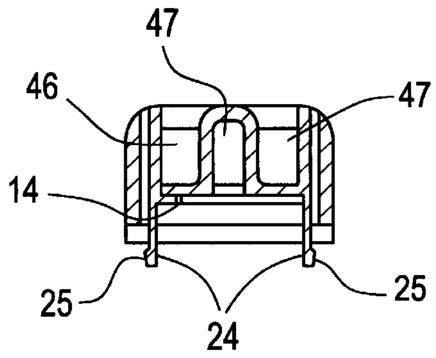
FIG. 5 is a section view along the line CC of FIG. 1.

In a corresponding way, according to FIGS. 2, 4 and 5, the cover 2 includes a recess 44, which, in the mounted position of the cover 2 on the base 1, is in alignment with the region 30 of the base 1, particularly in alignment with the PTC element 80 when the latter is housed in the base 1, so as to provide also a space in the cover 2 which assists in cooling the PTC element 80.

The electrically conductive elements 7,8 are also provided with respective female pin connectors 5,6, (FIGS. 13, 14, 15 and 16) which are disposed in recesses 37,38 (FIGS. 7 and 9) of the base 1, in alignment with respective openings for receiving pins 3,4 of the base 1, as can be seen from FIGS. 7, 8, 9, 11 and 19.

Figure 3:
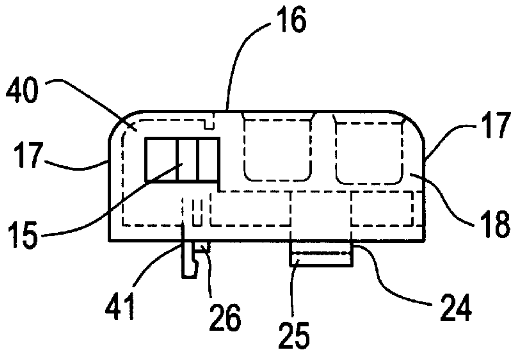
FIG. 3 is a side view of the cover.

The cover 2 is fitted onto the base 1 by engagement. The cover 2 comprises, according to FIGS. 1 and 3, a top wall 16 and side walls 17,18, which extend downward from the top wall 16, the side walls fitting substantially onto the outer walls 19 of the base (FIG. 7). For this engagement, the side walls 17,18 of the cover 2 and the outer walls 19 of the base 1 are provided with a recess 38 and a shoulder 39, respectively. For engagement of the cover 2 onto the base 1, pins 24 are provided at the cover (FIGS. 2 to 5) and corresponding slots 23 (FIGS. 7 and 8) in the base, the pins having a tooth-shaped end portion 25, which engages beyond the thickness of the base wall through which the slot 23 extends.

Figure 12:
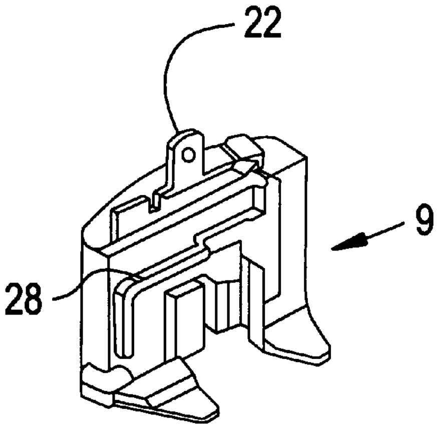
FIG. 12 is a perspective view of the motor protector.

The base 1 and the cover 2, when fitted together, define a region 40, according to the FIGS. 2 to 4, 8 and 9, where a conventional thermal protector 9 is housed by engagement. A detailed description of a thermal protector like the one illustrated in FIG. 12 and used with the present invention can be found in U.S. Pat. No. 4,241,370, which is incorporated herein by reference.

Figure 6:
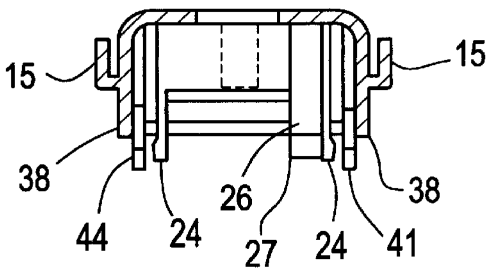
FIG. 6 is a section view along the line DD of FIG. 1.

According to the present invention, the thermal protector 9 is fitted fixedly into the capsule 1,2 by means of a pin 26 (FIGS. 3 and 6) provided at the cover, the pin having a tooth-shaped end portion 27, which engages a rib 28 provided on the thermal protector 9, when the latter is pressed into the capsule. In order to assist in accommodating the thermal protector 9 in the region 40, two further pins 41 having stop surfaces 42 at the middle of their height are provided at the cover 2, as well as a third stop surface 43 (FIG. 4), configured close to the side wall 17 of the cover, contiguous to the region 40, on which the thermal protector 9 is supported.

Figure 18:
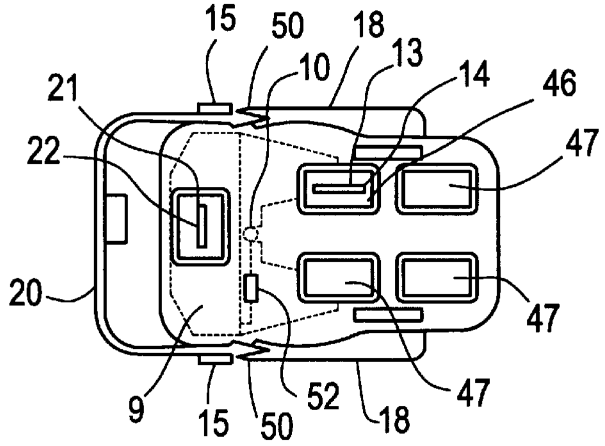
FIG. 18 is a top view of the assembly illustrated in FIG. 17.

The cover 2, according to FIGS. 2 and 18, has first and second openings 14,21, through which an electrically conductive tongue 13 (FIG. 13) provided at the element 7 and an electrically conductive tongue 22 (FIG. 12) provided at the motor protector 9 extend, both tongues being adapted for connection to power sources.

Figure 1:
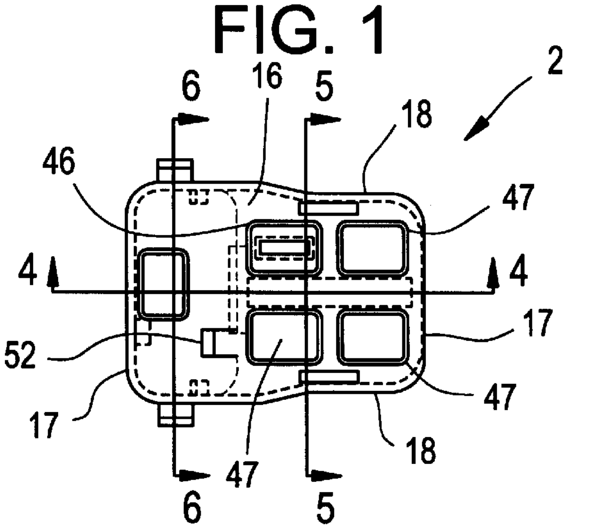
FIG. 1 is a top view of the cover.

According to FIGS. 1 and 18, the opening 14 is provided in a recess 46 of the cover 2, the cover 2 being also provided with three further recesses 47, where openings can be made, and capacitors may connected, depending upon the equipment with which the assembly is associated. A further opening 52 is provided in the cover 2, through which the tip of a tool (not shown) can be inserted for removing the thermal protector 9 from the capsule 1, 2.

The thermal protector 9 is provided with a female pin connector 10, which, in the mounted position of the thermal protector 9 in the capsule, is in two-to-two alignment with the first and second openings 3, 4, forming a triangle in a plane, so that the female pin connector 10 and the first and second openings 3,4 can be received on corresponding pins of a thermal connector of a compressor.

Figure 17:
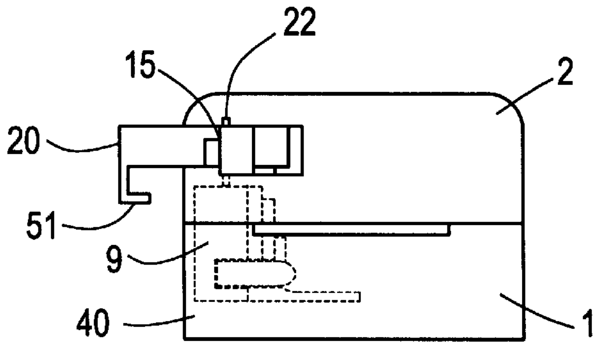
FIG. 17 is a side view of the capsule motor protector and clamp assembly.

The opposed side walls 18 of the cover 2 are provided with loops 15 (FIGS. 3 and 6) adapted for receiving a fixing clamp 20 for fixing the assembly to the compressor housing. As can be seen from FIGS. 17–19, the clamp has shoulder ends 50, which engage the back region of the loops 15, and a projection 51, which fits into a corresponding slot provided in the compressor housing (not shown).

Figure 19:
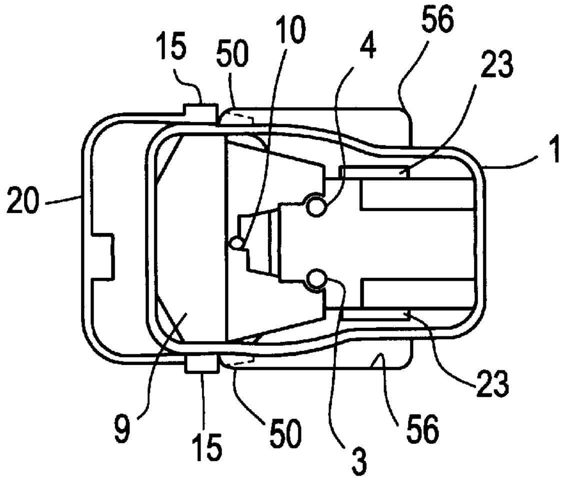
FIG. 19 is a bottom view of the assembly illustrated in FIG. 17.

In order to facilitate the fitting and withdrawal of the assembly from the contact pins of the compressor, tabs 56 are provided at the base 1 (FIG. 19).

It should be understood that the above-described assembly represents only one of the possible embodiments of the present invention, the actual scope of which is defined in the claims.

What is claimed is:

1. An assembly of electric motor-controlling components, comprising a capsule made of an electrically insulating material, having a base and a cover that can be fitted onto the base, first and second pin-receiving openings formed at the base, at least one female pin connector disposed at the base in alignment with each pin-receiving opening, a disc-shaped PTC element disposed in the capsule perpendicularly to the base said PTC elements being electrically connected to said female pin connector, a motor protector provided with another female pin connector, the motor protector being mounted and locked into the capsule in the fitted position of the cover on the base, said another female pin connector and the first and second openings capable of being received on corresponding pins of a terminal connector of a conventional compressor.

2. The assembly according to claim 1, further comprising said PTC element having first and second opposed faces, and said PTC element being electrically connected to the pin connectors by respective electrically conductive resilient means, which contact first and second faces of the PTC element, respectively.

3. The assembly according to claim 1, further comprising a tongue provided for electrically connecting the PTC element to said at least one pin connector, the tongue extending through and out of the first opening provided in the cover.

4. The assembly according to claim 1, further comprising that the cover includes a top wall and opposed side walls which extend downward from the top wall, the side walls substantially fitting onto outer walls of the base.

5. The assembly according to claim 4, wherein opposed side walls of the cover are provided with loops adapted to receive a fixing clamp for fixing the assembly to a compressor housing.

6. The assembly according to claim 4, wherein the cover is provided with a second opening, through which an electrically conductive tongue provided at the motor protector extends.

7. The assembly according to claim 1, wherein the cover is fixedly fitted onto the base by means of pins provided at the cover and corresponding slots provided in the base, the pins having tooth-shaped end portion which engages beyond the thickness of the wall of the base, through which the slot extends.

8. The assembly according to claim 1, wherein the motor protector is fitted fixedly into the capsule by means of a pin provided at the cover, the pin having a tooth-shaped end portion which engages a rib provided on the motor protector.

* * * * *